Patented July 5, 1932

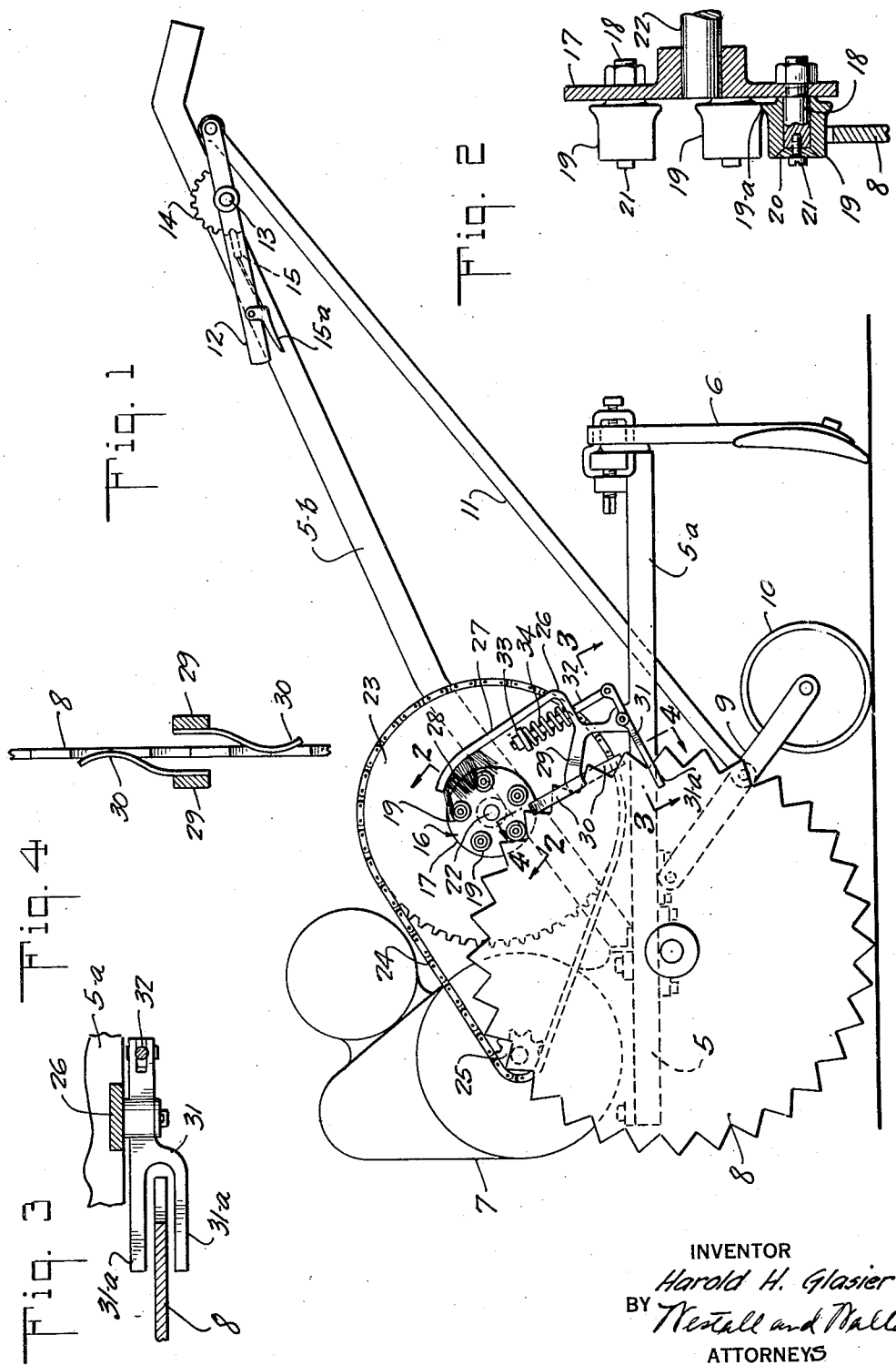

1,865,898

UNITED STATES PATENT OFFICE

HAROLD H. GLASIER, OF LOS ANGELES, CALIFORNIA

RIM GEAR DRIVE TRACTOR

Application filed April 29, 1931. Serial No. 533,628.

This invention relates to a self propelled ground working tool and especially the traction member which combines the functions of a traction wheel or disk and a cutting member. The invention contemplates a serrated traction disk or wheel and novel motion transmitting means.

It is the primary object of this invention to provide a serrated cutting edge for the traction disk, which edge may also perform the function of a driven gear. In addition to the broader feature of this invention, there are details of structure for maintaining the serrations clean.

These objects together with other objects and corresponding accomplishments are obtained by the embodiment of my invention illustrated in the accompanying drawing, in which:

Fig. 1 is a side elevation of the complete implement; Figs. 2 and 3 are sections on an enlarged scale as seen on the lines correspondingly numbered in Fig. 1; Fig. 4 is a section showing cleaning clips for the disk.

Referring with more particularity to the drawing, 5 indicates a frame having a hitch portion 5a for attachment thereto of any desired ground working tool 6. A handle 5b serves for guiding the tool. Mounted upon the frame is a motor 7 for driving the implement.

Journalled on the frame is a serrated disk wheel 8 which serves as a traction wheel and also for cutting the ground in advance of the ground working tool 6. An arm 9 is pivotally mounted upon the frame and journalled on the end thereof is an idler wheel 10 which may serve as a gauge wheel to control the depth of cutting of the disk wheel 8 and also as a carrier wheel. The position of this wheel is made adjustable. To this end, a brace rod 11 is pivotally secured to the arm 9 and its other end is secured to a lever 12 pivotally secured at 13 to the handle portion of the frame. A keeper 14 is fixed to the handle portion of the frame and coacts with a detent 15 operated from a hand grip 15a secured to the lever 12. Obviously, the position of the gauge wheel 10 may be set by means of the lever 12.

Journalled upon the frame is a cog gear 16, best shown in Fig. 2. This gear comprises a disk 17 having pintles 18 secured thereto upon which are rotatably mounted rollers 19. The ends of the rollers are counterbored to receive retaining caps 20 held in place by machine screws 21. The bases of the rollers are provided with outflaring shoulders 19a. The rollers mesh with the serrations on disk wheel 8 so that the latter forms a driven gear. The outflaring base of the rollers serves to divert any grit from entering the bearing surfaces, and the outside of the rollers being open enables any particles of grit to leave freely. The shaft 22 to which disk 17 is fixed carries a sprocket gear 23. A sprocket chain 24 is passed over gear 23 and over a sprocket pinion 25 which is driven from the motor drive shaft. Obviously, any suitable type of transmission gearing between the motor and cog gear may be employed.

Mounted upon the frame is a bracket 26 having an arm 27 provided with wire bristles 28 disposed to wipe and clean the rollers of dirt and grit. Another arm 29 extends from the bracket and is bifurcated so as to straddle the disk. Spring clips are attached to the arm 29 with their free ends entering the indentations of the disk and aiding in cleaning the latter of any dirt accumulation.

Pivotally mounted upon the frame at the base of bracket 26 is a hand 31 having fingers 31a embracing the side of the disk wheel 8 as best shown in Fig. 3. Pivotally secured to the outer end of the hand is a stem 32 which passes through an opening in bracket 26. At the head of the stem is a nut and washer 33 confining a compression spring 34 thereon and tending to hold the hand 31 in position with the fingers pointing inwardly of the disk. The fingers 31a engage any large particles or lumps such as dirt or rocks which may lodge between teeth on the disk wheel and cause the particles to be forced outwardly along the sides of the teeth so as to be dislodged. The hand being resiliently mounted can yield and no shock will be occasioned by impact of such lumps against the hand.

The invention resides primarily in the disk 8 performing three functions, namely, that of traction, cutting the ground and as a driven gear.

What I claim is:

1. A self propelled ground working implement comprising a frame, a traction and ground cutting wheel journalled thereon, said wheel having peripheral serrations, and a motor mechanism to drive said wheel having gearing meshing with the serrations of said wheel to drive the latter.

2. A self propelled ground working implement comprising a frame, a traction and ground cutting wheel journalled thereon, said wheel having peripheral serrations, and a motor mechanism to drive said wheel having a gear including laterally extending rollers meshing with the serrations of said wheel to drive the latter.

3. A self propelled ground working implement comprising a frame, a traction and ground cutting wheel journalled thereon, said wheel having peripheral serrations, and a motor mechanism to drive said wheel having a gear including laterally extending rollers meshing with the serrations of said wheel to drive the latter, said rollers having an outflaring base.

4. A self propelled ground working implement comprising a frame, a traction and ground cutting disk journalled thereon, said wheel having peripheral serrations, a motor mechanism to drive said wheel having a gear meshing with the serrations of said wheel to drive the latter, and cleaning fingers for said disk straddling the latter.

5. A self propelled ground working implement comprising a frame, a traction and ground cutting disk journalled thereon, said wheel having peripheral serrations, a motor mechanism to drive said wheel having a gear meshing with the serrations of said wheel to drive the latter, a cleaner comprising a hand pivotally mounted on said frame and provided with fingers straddling the disk, and resilient means tending to hold said hand with said fingers pointing inwardly of the disk.

6. A self propelled ground working implement comprising a frame, a traction and ground cutting disk journalled thereon, said wheel having peripheral serrations, a motor mechanism to drive said wheel having a gear including laterally extending rollers meshing with the serrations of said wheel to drive the latter, said rollers having an outflaring base, a brush mounted on said frame to wipe said rollers, a cleaner for the serrations of said disk comprising a hand pivotally mounted on said frame and provided with fingers straddling said disk, and resilient means tending to hold said hand with said fingers pointing inwardly of the disk.

In witness that I claim the foregoing I have hereunto subscribed my name this 20th day of April 1931.

HAROLD H. GLASIER.